United States Patent
Zhang et al.

(10) Patent No.: US 10,982,355 B2
(45) Date of Patent: Apr. 20, 2021

(54) KNIT TUBULAR PROTECTIVE SLEEVE AND METHOD OF CONSTRUCTION THEREOF

(71) Applicant: Federal-Mogul Powertrain, LLC, Southfield, MI (US)

(72) Inventors: Zhong Huai Zhang, Pottstown, PA (US); Ritesh Mehbubani, Royersford, PA (US); Linwood Ludy, Pottstown, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 143 days.

(21) Appl. No.: 15/658,128

(22) Filed: Jul. 24, 2017

(65) Prior Publication Data
US 2018/0023222 A1 Jan. 25, 2018

Related U.S. Application Data

(60) Provisional application No. 62/366,521, filed on Jul. 25, 2016.

(51) Int. Cl.
*D02G 3/44* (2006.01)
*D02G 3/36* (2006.01)
(Continued)

(52) U.S. Cl.
CPC .............. *D02G 3/443* (2013.01); *D02G 3/182* (2013.01); *D02G 3/36* (2013.01); *D04B 1/225* (2013.01);
(Continued)

(58) Field of Classification Search
CPC ........ D02G 3/443; D02G 3/442; D02G 3/446; D02G 3/182; D02G 3/36; D04B 1/225;
(Continued)

(56) References Cited

U.S. PATENT DOCUMENTS 3,614,967 A * 10/1971 Royston ................ F16L 59/023
138/141
4,735,717 A * 4/1988 Sims ...................... B01D 53/22
210/247
(Continued)

FOREIGN PATENT DOCUMENTS

WO 2009026578 A1 2/2009

OTHER PUBLICATIONS

International Search Report, dated Oct. 2, 2017 (PCT/US2017/043579).

*Primary Examiner* — Danny Worrell
*Assistant Examiner* — Dakota Marin
(74) *Attorney, Agent, or Firm* — Robert L. Stearns; Dickinson Wright, PLLC

(57) ABSTRACT

A knit sleeve for providing thermal protection about an elongate member contained therein and method of construction thereof is provided. The sleeve includes a knit inner wall with opposite edges extending lengthwise between opposite ends and a circumferentially continuous tubular outer wall knit integrally with the inner wall. The outer wall bounds a central cavity that extends lengthwise along a central axis between open opposite ends of the outer wall. The opposite edges of the inner wall are substantially parallel to the central axis and are wrappable toward one another to form the inner wall as being tubular. The circumferentially continuous tubular outer wall is configured to be everted about the wrapped inner wall to circumferentially surround and protect the inner wall from abrasion and provide the sleeve with a dual layer wall.

21 Claims, 3 Drawing Sheets

(51) Int. Cl.
   *D02G 3/18*     (2006.01)
   *D04B 7/32*     (2006.01)
   *D04B 15/10*    (2006.01)
   *D04B 1/22*     (2006.01)
   *F16L 59/02*    (2006.01)
   *D04B 1/14*     (2006.01)
   *B32B 5/26*     (2006.01)
   *F16L 57/04*    (2006.01)

(52) U.S. Cl.
   CPC .............. *D04B 7/32* (2013.01); *D04B 15/10* (2013.01); *B32B 5/26* (2013.01); *D02G 3/442* (2013.01); *D02G 3/446* (2013.01); *D04B 1/14* (2013.01); *F16L 57/04* (2013.01); *F16L 59/029* (2013.01)

(58) Field of Classification Search
   CPC .. D04B 1/14; D04B 7/32; D04B 15/10; B32B 5/26; F16L 57/04; F16L 59/029
   USPC ............................. 66/170; 138/125; 428/36.1
   See application file for complete search history.

(56) References Cited

U.S. PATENT DOCUMENTS

| | | | | |
|---|---|---|---|---|
| 4,778,703 | A * | 10/1988 | Fontanilla | B32B 7/06 428/40.6 |
| 5,022,459 | A * | 6/1991 | Chiles | E01C 11/26 165/11.1 |
| 6,978,643 | B2 | 12/2005 | Akers et al. | |
| 7,595,451 | B2 * | 9/2009 | Kircanski | F01N 3/2853 174/117 M |
| 8,505,339 | B2 | 8/2013 | Malloy et al. | |
| 8,757,215 | B2 * | 6/2014 | Burdy | D03D 1/0041 139/383 R |
| 8,875,746 | B2 | 11/2014 | Harris et al. | |
| 9,028,937 | B2 * | 5/2015 | Harris | B32B 1/08 428/36.1 |
| 2002/0195260 | A1 * | 12/2002 | Marks | D04C 1/06 174/351 |
| 2007/0207186 | A1 * | 9/2007 | Scanlon | A61F 2/07 424/424 |
| 2007/0240896 | A1 * | 10/2007 | Ott, Jr. | H02G 3/0481 174/93 |
| 2007/0243356 | A1 * | 10/2007 | Baer | B32B 3/02 428/99 |
| 2007/0251595 | A1 * | 11/2007 | Chen | D02G 3/16 139/420 C |
| 2008/0006432 | A1 * | 1/2008 | Yamaguchi | B60R 16/0215 174/68.3 |
| 2008/0135119 | A1 * | 6/2008 | Tonooka | D03D 3/02 138/110 |
| 2009/0049869 | A1 | 2/2009 | Malloy et al. | |
| 2010/0108171 | A1 * | 5/2010 | Relats Manent | F16L 57/04 138/125 |
| 2010/0316822 | A1 * | 12/2010 | Malloy | D06N 3/0015 428/36.1 |
| 2012/0037258 | A1 * | 2/2012 | Shumate | B29C 63/06 138/141 |
| 2012/0040114 | A1 * | 2/2012 | Chen | F16L 11/125 428/34.5 |
| 2012/0082807 | A1 * | 4/2012 | Malloy | F01N 13/148 428/34.1 |
| 2013/0306186 | A1 | 11/2013 | Goulet | |
| 2014/0069540 | A1 * | 3/2014 | Chesnais | F16L 53/38 138/32 |
| 2015/0314551 | A1 * | 11/2015 | Chen | D03D 1/0035 428/35.2 |
| 2016/0016376 | A1 | 1/2016 | Woodruff et al. | |
| 2016/0021799 | A1 * | 1/2016 | Harris | H05K 9/009 174/350 |

* cited by examiner

KNIT TUBULAR PROTECTIVE SLEEVE AND METHOD OF CONSTRUCTION THEREOF

CROSS-REFERENCE TO RELATED APPLICATION

This application claims the benefit of U.S. Provisional Application Ser. No. 62/366,521, filed Jul. 25, 2016, which is incorporated herein by reference in its entirety.

BACKGROUND OF THE INVENTION

1. Technical Field

This invention relates generally to tubular protective sleeves for providing protection to elongate members contained therein, and more particularly to knit tubular protective sleeves and to their method of construction.

2. Related Art

Tubular sleeves are known for protecting elongate members, such as wires and pipes, against abrasion and thermal conditions. The sleeves are commonly constructed from heat resistant yarns, such as silica, fiberglass, ceramic, basalt, aramid or carbon, to withstand relatively high temperatures. Sleeves constructed from such heat-resistant yarns are commonly used to insulate high temperature tubes, such as those providing a conduit for hot liquid or gas, such as exhaust gases, to inhibit the heat from radiating outwardly beyond the confines of the tubing. Also, the sleeves are used to protect the contents within the sleeves, such as a wire harness, for example, from exposure to heat external to the sleeve. Although the sleeves discussed above are generally effective in providing a thermal barrier, the heat-resistant yarn that forms the outer wall of the sleeves is susceptible to damage, and thus, the useful life of the sleeves can be diminished.

SUMMARY OF THE INVENTION

In accordance with one aspect of the invention, a knit sleeve for providing thermal protection about an elongate member contained therein is provided. The sleeve includes a knit inner wall with opposite edges extending lengthwise between opposite ends and a circumferentially continuous tubular outer wall knit integrally with the inner wall. The outer wall bounds a central cavity that extends lengthwise along a central axis between open opposite ends of the outer wall. The opposite edges of the inner wall are wrappable toward one another to form the inner wall as being tubular. The circumferentially continuous tubular outer wall is configured to be everted about the wrapped inner wall to circumferentially surround and protect the inner wall from abrasion and provide the sleeve with a dual layer wall.

In accordance with another aspect of the invention, the type of yarn forming the outer wall is different from the type yarn forming the inner wall, wherein the yarn forming the outer wall has a greater impact resistance relative to the yarn forming the inner wall, and the yarn forming the inner wall has a greater heat-resistance than the yarn forming the outer wall.

In accordance with another aspect of the invention, the yarn forming the outer wall can be coated with an impact and/or abrasion resistant material to provide enhanced protection to the inner wall against damage from impact and/or abrasion, wherein the coating is protected against degradation from exposure to heat by the heat-resistant inner wall.

In accordance with another aspect of the invention, the outer wall and/or yarn of the outer wall can be coated with impact and abrasion resistant silicone or polytetrafluoroethene (PTFE), referred to hereafter as Teflon.

In accordance with another aspect of the invention, one of the opposite edges of the inner wall can be knit integrally to the outer wall.

In accordance with another aspect of the invention, the outer wall can be knit integrally to the inner wall along a knit joint seam extending between the opposite ends of the inner wall and between the opposite edges of the inner wall.

In accordance with another aspect of the invention, a method of constructing a tubular textile sleeve for containing an elongate member therein is provided. The method includes knitting an inner wall having opposite edges extending lengthwise between opposite ends. Further, knitting a circumferentially continuous tubular outer wall having a central cavity extending lengthwise along a central axis between open opposite ends integrally with the inner wall such that the inner wall extends away from the outer wall. Further, wrapping the inner wall to form the inner wall into a tubular wall. Then, everting the circumferentially continuous tubular outer wall about the wrapped tubular inner wall to circumferentially surround the tubular inner wall and provide the sleeve with a dual layer protective wall.

In accordance with another aspect of the invention, the method can further include integrally knitting one of the opposite edges of the inner wall to the outer wall.

In accordance with another aspect of the invention, the method can further include integrally knitting the outer wall with the central axis thereof extending substantially parallel to the opposite edges of the inner wall, with the outer wall being knit to the inner wall along a knit joint seam extending between the opposite ends of the inner wall and between the opposite edges of the inner wall.

In accordance with another aspect of the invention, the method can further include forming the outer wall with yarn having a greater impact resistance relative to the yarn forming the inner wall.

In accordance with another aspect of the invention, the method can further include coating the yarn forming the outer wall with an impact resistant material, wherein the inner wall acts to prevent heat from radiating radially outwardly, thereby preventing degradation to the yarn forming the outer wall, as well as preventing degradation to the impact resistant material coating. Accordingly, synergies provided by the inner and outer walls allow each to be constructed for different types of protection, namely, resistance to heat provided largely by the inner wall, and abrasion and impact resistance provided by the outer wall, wherein the inner wall serves in part to prevent damage to the outer wall and vice versa.

In accordance with another aspect of the invention, the method can further include providing the impact resistant material coating the yarn of the outer wall as silicone or Teflon.

In accordance with another aspect of the invention, the method can further include forming the inner wall with a heat resistant mineral yarn, such as from fiberglass, silica, basalt, ceramic, slate, slag, or the like, and forming the outer wall from a different yarn having an increased impact resistance relative to the yarn forming the inner wall. The heat resistant mineral yarn inhibits the radiation of heat radially outwardly, thereby preventing degradation to the yarn forming the outer wall.

In accordance with another aspect of the invention, the method can further include knitting the inner wall with a first type of yarn and knitting the outer wall with a second type of yarn different from the first type of yarn, wherein the first type of yarn has an increased thermal insulating property relative to the second type of yarn and the second type of yarn has an increased toughness relative to the first type of yarn.

In accordance with another aspect of the invention, the method can further include knitting the inner and outer wall simultaneously together on a flatbed knitting machine.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
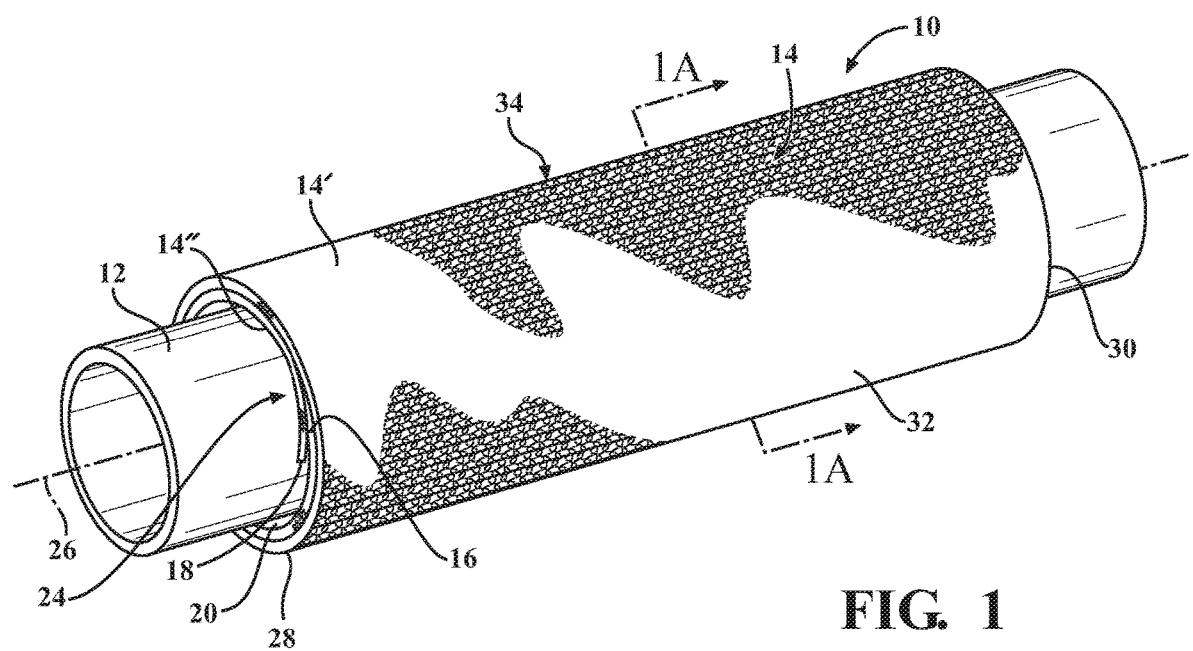
FIG. 1 is schematic isometric view of a knit tubular sleeve constructed in accordance with one aspect of the invention shown with an elongate tubular member to be protected extending therethrough.
Figure 1A:
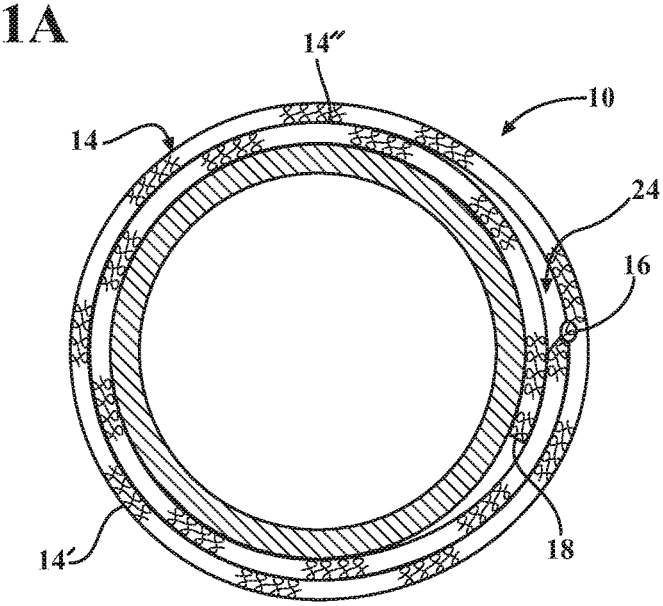
FIG. 1A is a schematic cross-sectional view taken generally along the line 1A-1A of FIG. 1.

Referring in more detail to the drawings, FIG. 1 illustrates a knit protective tubular sleeve 10 constructed in accordance with one embodiment of the disclosure shown disposed about an elongate member 12 to be protected. The sleeve 10 is protective in that it provides a thermal barrier, particularly to extreme heat, whether preventing heat from radiating radially outwardly, such as from the elongate member 12 contained within the sleeve, e.g. hot pipes within an engine compartment or an exhaust pipe, or providing a protective barrier to an elongate member 12, e.g. wire harness or cable contained within the sleeve 10, against heat from radiating inwardly from nearby hot components, e.g. an exhaust pipe. The sleeve 10 also provides protection against environmental contaminants from entering and/or damaging the sleeve 10 or the contents 12 within the sleeve 10, such as against impact resistance from stone impingement or the like, abrasive debris or surfaces and liquid contaminants, e.g. fuel, oil, water. The sleeve 10 has an integral, single piece tubular knit wall 14, which includes a knit outer wall 14' and a knit inner wall 14" disposed within the outer wall 14'. The outer and inner walls 14', 14" are knitted together in a single knitting process via a flatbed knitting machine, and thus, the finished sleeve 10 can be readily handled as a single product and does not require secondary stitching processes to join the outer and inner walls 14', 14" to one another. The outer and inner walls 14', 14" both provide thermal protection; however, the primary function of the outer wall 14' is to provide mechanical protection to the inner wall 14" and its contents 12 against abrasion and damage, such as from debris impacting, cutting, and/or abrading the inner wall 14". Meanwhile, the primary function of the inner wall 14" is to provide thermal protection about the elongate member 12, such as by acting as a thermal barrier and/or heatsink to prevent heat from radiating outwardly from the elongate member 12 and radially outwardly from the inner wall 14", particularly in exhaust pipe applications or other extreme heat applications, including pipes acting as a conduit to high temperature fluids, such as radiator pipes, hoses and the like. By the inner wall 14" preventing heat from radiating outwardly, other vehicle systems and components are protected against being exposed to heat flow through the exhaust pipe 12. Further yet, the outer wall 14' is protected against exposure to the extreme heat blocked by the inner wall 14", and thus, the yarns used to construct the outer wall 14' can be provided having different properties than the yarns used to construct the inner wall 14", as desired. Further yet, as will be discussed in more detail below, coating materials having impact resistant and/or chemical resistant properties can be applied to the outer wall 14' or to the yarns thereof without concern over high temperatures degrading the coating material. Accordingly, synergies are provided by the separate outer and inner walls 14', 14", wherein each functions to the benefit of the other, as well as to the internal contents 12 of the sleeve 10, thereby providing the sleeve 10 with optimal performance attributes.

The textile sleeve 10 is knit via a computerized flatbed knitting machine, by way of example and without limitation, having opposing flat beds. With the sleeve wall 14 being constructed on a computerized flatbed knitting machine, the type of knit stitches used to construct the outer and inner walls 14', 14" can be varied, as desired, for the intended application. Accordingly, the wall 14 can be knit using any type or combination of knit stitches, e.g. jersey, interlock, rib forming stitches, or otherwise, such that the outer and inner walls 14', 14" may be knit using a single or multiple knit stitch types, wherein the types of knit stitches used to form the outer and inner walls 14', 14" can be the same or different from one another. Further, the wall 14 can be constructed having any suitable length and diameter, as determined by the diameter provided by the outer and inner walls 14', 14". As will be evident to one possessing ordinary skill in the art, the diameter of the outer wall 14' is controlling, as the inner wall 14" is ultimately confined by the outer wall 14'.

The inner wall 14" is knit as a generally flat piece of material, such as via needles from one of the two beds. The inner wall 14" has opposite edges 16, 18 extending lengthwise between opposite ends 20, 22. The inner wall 14" is knit with one or more yarns that are heat resistant and non-heat-settable, multifilament and/or monofilament, and that are suitable for withstanding extreme temperature environments ranging from between about −60 to 1400 degrees centigrade. The selected multifilament yarns can be formed with mineral fiber materials, such as silica, fiberglass, ceramic, basalt, slate, slag, aramid or carbon, by way of example and without limitation. The mineral fibers can be provided having a continuous or chopped fiber structure. In some applications of extreme heat, it may be desirable to heat treat the sleeve material to remove organic content therefrom, thereby increasing even more the heat resistance capacity of the sleeve 10. The high heat resistant yarn listed above, although being exceptional for withstanding extreme heat, are generally susceptible to damage if brought into direct contact with abrading and/or impact forces, and thus, the outer wall 14' is constructed to greatly enhance the resistance to damage of the inner wall 14" against abrasion and impact forces and to greatly increase the overall durability of the finish sleeve 10.

Figure 2A:
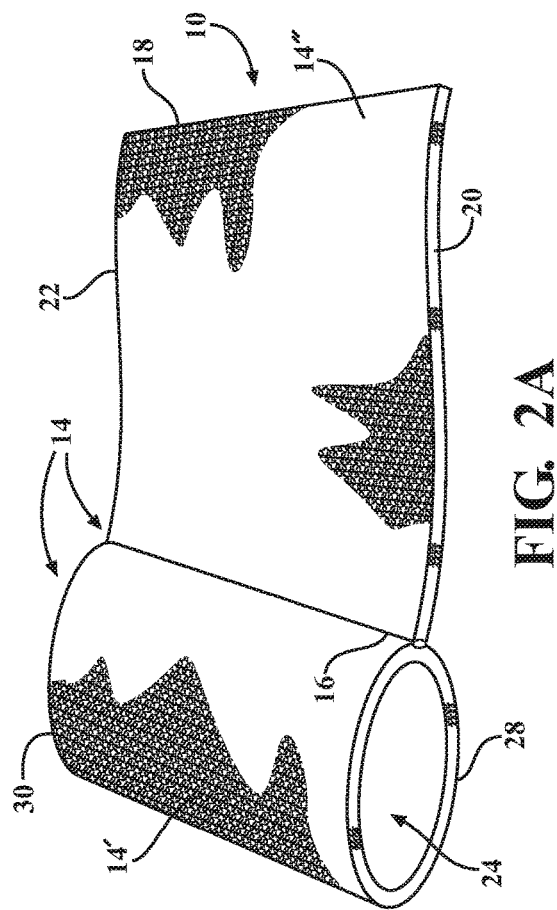
FIG. 2A is a view of the sleeve of FIG. 1 shown in a first pre-assembled state.

The outer wall 14' is knit as a circumferentially continuous tubular wall via both beds of the flatbed knitting machine, with one bed being predominantly responsible for knitting an upper portion or half (first side) of the outer wall 14' and the opposite bed being predominantly responsible for knitting a lower portion or half (second side) of the outer wall 14', with the two portions being simultaneously knit together in seamless, tubular fashion. During the knitting process, the outer wall 14' is knit integrally with the inner wall 14" as a single piece of material, wherein the embodiment shown in FIG. 2A illustrates the outer wall 14' being knit integrally with one of the opposite edges 16 of the inner wall 14", with the opposite edge 18 of the inner wall 14" remaining free. Being that the outer wall 14' is circumferentially continuous and seamless, the outer wall 14' bounds a central cavity 24 that extends lengthwise along a central axis 26 between open opposite ends 28, 30. The outer wall 14' can be knit using any desired type of yarn material, whether monofilament yarn and/or multifilament yarn, depending on the physical characteristics sought for the application. The yarn used to knit the outer wall 14' can be less resistant to heat than the yarn used to knit the inner wall 14" given the inner wall 14" acts as a barrier to heat reaching the outer wall 14'. As such, a yarn more well suited to withstand abrasion and impact from external debris can be used to construct the outer wall 14', thereby resulting in the sleeve 10 being both able to withstand abrasion and debris from external sources via the outer wall 14' with significant damage thereto, while also functioning as an optimal barrier to radiating heat from the hot elongate member 12 via the inner wall 14". Some yarns believed to be suitable for knitting the outer wall 14' include polyester, nylon, polypropylene, polyethylene, acrylic, cotton, rayon, and fire retardant (FR) versions of all the aforementioned materials, as desired for the intended application. In addition to the aforementioned materials, if desired, it is contemplated that the same mineral fiber yarn(s) used to construct the inner wall, or different mineral fiber yarn(s), could be used to construct the outer wall 14', with an abrasion and/or impact resistant coating material 32 being applied to the outer wall 14' or directly to the mineral fiber yarn prior to knitting the outer wall 14'. By applying the coating material 32 to the yarn used to form the outer wall 14', such as silicone or Teflon, by way of example and without limitation, the outer wall 14' is made more abrasion/impact resistant, while at the same time providing further enhanced protection against heat from radiating outwardly from the sleeve 10. As mentioned, the ability to use the coating material 32 on the yarn(s) of the outer wall 14' is made possible via the inner wall 14" acting as a heat barrier to the outer wall 14', thereby reducing the potential for the outer wall 14' to be exposed to heat, thus, preventing radiating heat from degrading the impact and/or abrasion resistance attributes of the coating material 32. It is contemplated that the temperature of an outer surface 34 of the outer wall 14' can be maintained below about 250 degrees ° C., even in extreme heat applications, such as an exhaust pipe application, by forming the inner wall 14" from the aforementioned high heat-resistant yarn(s) and by controlling the thickness of the inner wall 14", and thus, the heat experienced by the coating material 32 is maintained within functional limits preventing thermal breakdown of the coating material 32. Of course, where the durability requirements of the sleeve 12 are not severe, the thickness of the inner wall 14" could be reduced; however, this would result in reduced thermal performance.

Figure 3A:
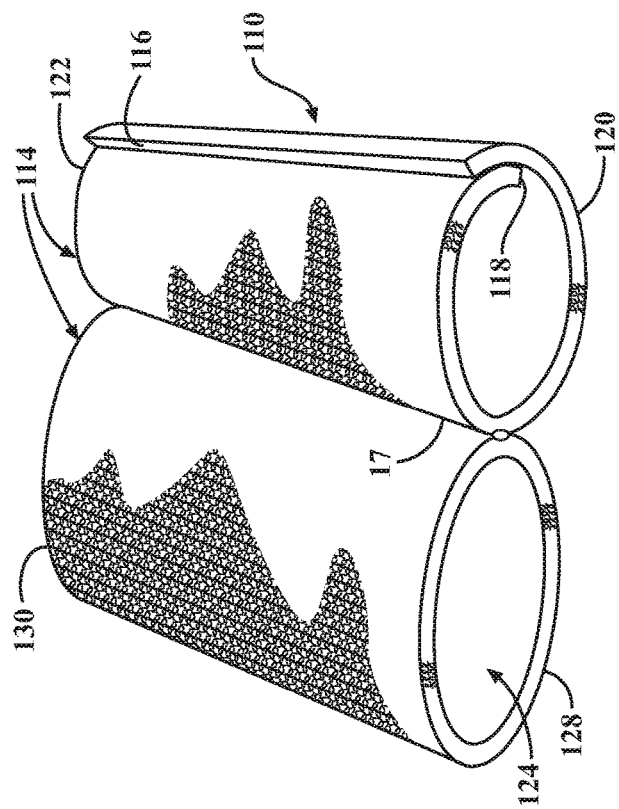
FIG. 3A is a view similar to FIG. 2A of a knit tubular sleeve constructed in accordance with another aspect of the invention shown in a first pre-assembled state.
Figure 3B:
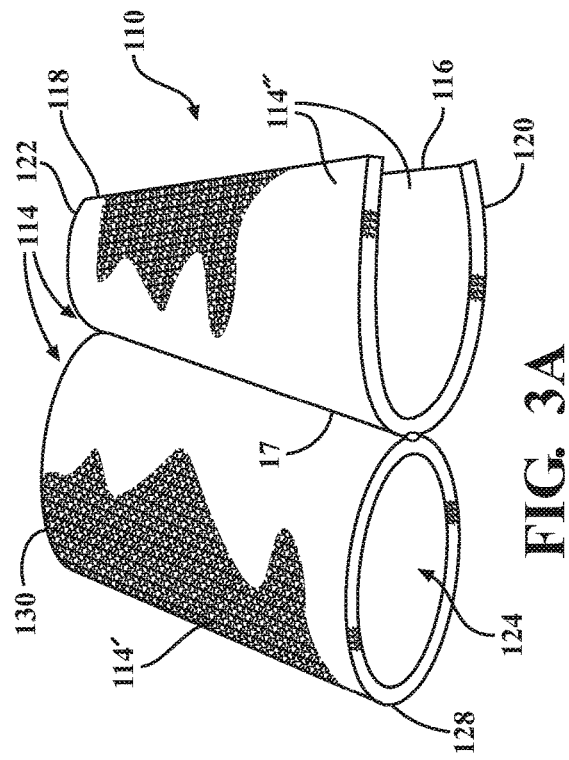
FIG. 3B is a view of the sleeve of FIG. 3A shown in a second pre-assembled state.
Figure 3C:
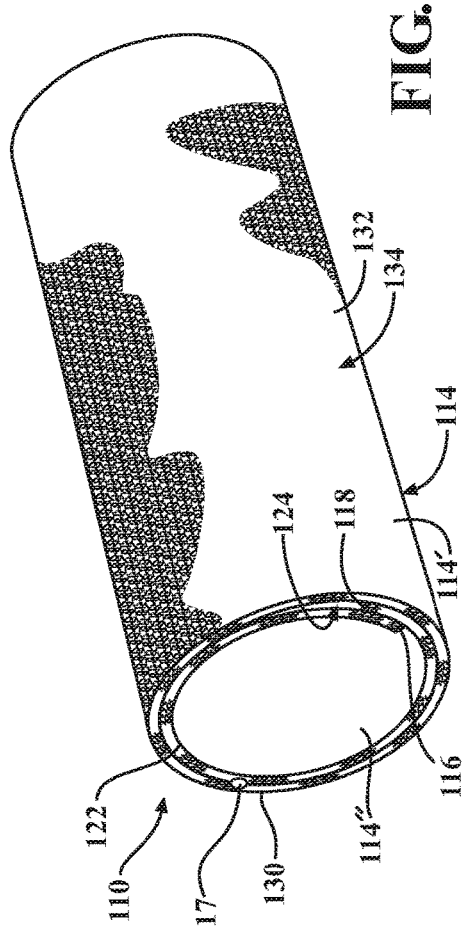
FIG. 3C is a view of the sleeve of FIG. 3A shown in an assembled state.

In FIGS. 3A-3C, a sleeve 110 constructed in accordance with another aspect of the disclosure is shown, wherein the same reference numerals, offset by a factor of 100, are used to identify like features as discussed above. The sleeve 110 includes all the same features as discussed for the sleeve 10, including an integral, single piece tubular knit wall 114, which includes a knit outer wall 114' and a knit inner wall 114" disposed within the outer wall 114'. Further, as discussed above, the outer and inner walls 114', 114" are knitted together in a single knitting process. Further yet, the outer and inner walls 114', 114" can be knit of any desired yarn or yarns via any suitable knit stitch and pattern as discussed above.

The inner wall 114" is knit as a generally flat piece of material, such as via needles from one of the two beds, having opposite edges 116, 118 extending lengthwise between opposite ends 120, 122.

The outer wall 114' is knit as a circumferentially continuous and seamless wall bounding a central cavity 124 that extends lengthwise along a central axis 126 between open opposite ends 128, 130. The outer wall 114' is knit integrally with the inner wall as a single piece of material, similar to that discussed above; however, rather than the outer wall 114' being knit integrally to one of the opposite edges 116, 118 of the inner wall 114", the outer wall 114' is shown knit integrally to the inner wall 114" along a straight knit joint seam S extending between the opposite ends 120, 122 of the inner wall 114" and between the opposite edges 116, 118 of the inner wall 114", shown as extending midway between the opposite edges 116, 118, by way of example and without limitation. As such, it is to be recognized that the flat bed knitting machine can be made to integrally knit the outer wall 114' to the inner wall 114" along any desired location of the inner wall 114".

Figure 2B:
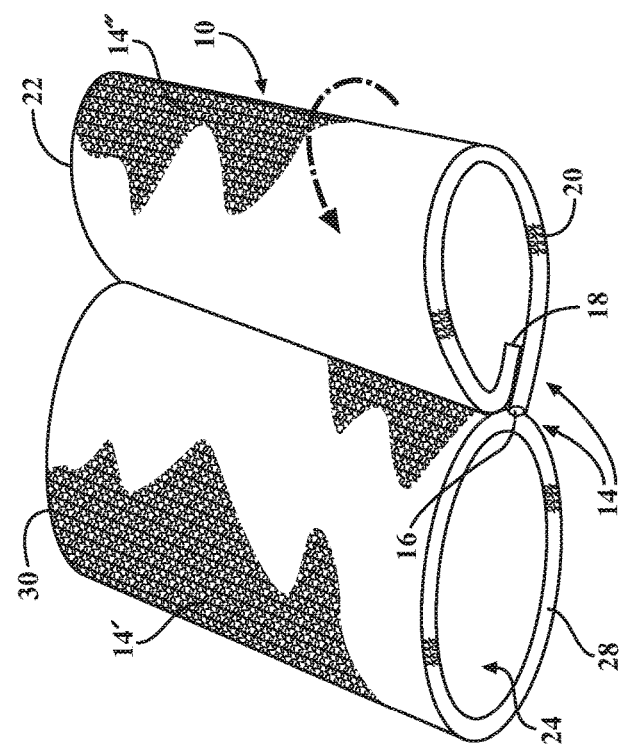
FIG. 2B is a view of the sleeve of FIG. 1 shown in a second pre-assembled state.
Figure 2C:
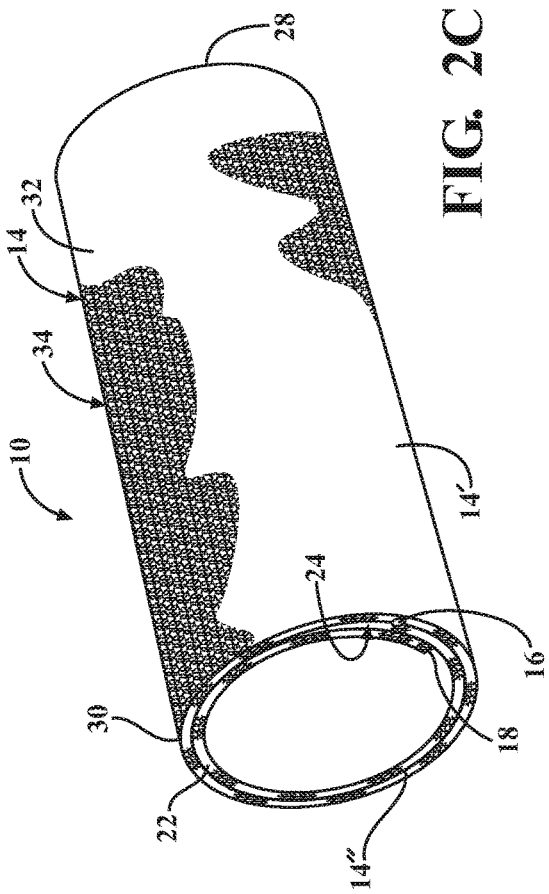
FIG. 2C is a view of the sleeve of FIG. 1 shown in an assembled state.

Upon completing the knitting of the outer and inner walls 14', 14"; 114', 114" as shown in FIGS. 2B and 3B, the opposite edges 16, 18; 116, 118 of the inner wall 14", 114" are wrapped toward one another to form the inner wall 14", 114" as being tubular such that the edges 16, 18; 116, 118 preferably overlap one another at least slightly. Then, as shown in a completed state in FIGS. 2C and 3C, the circumferentially continuous tubular outer wall 14', 114' is everted, also referred to as reverse folded, about the entirety of the wrapped inner wall 14", 114" to circumferentially surround the full length of the inner wall 14", 114", such that the opposite ends 120, 122 of the inner wall 114" are brought to be flush or substantially flush with the opposite ends 128, 130 of the outer wall 114', respectively. Accordingly, the inner and outer walls 14", 14'; 114", 114' provide the sleeve 10, 110 with the circumferentially continuous dual layer protective wall 14, 114, wherein the inner layer 14", 114" provides the majority of thermal protection and the outer layer 14', 114' provides the majority of durability, i.e. impact resistance and/or abrasion resistance, to the sleeve 10, 110.

Many modifications and variations of the present invention are possible in light of the above teachings, as will be readily appreciated by one possessing ordinary skill in the art. It is contemplated that all features of all claims and of all embodiments can be combined with each other, so long as such combinations would not contradict one another. It is, therefore, to be understood that the invention may be practiced otherwise than as specifically described, and that the scope of the invention is defined by any ultimately allowed claims.

The invention claimed is:

1. A knit sleeve for providing thermal protection about an elongate member, comprising:
    a knit inner wall with opposite edges extending lengthwise between opposite ends;
    a seamless, circumferentially continuous, tubular outer wall knit integrally to said inner wall, said circumferentially continuous, tubular outer wall bounding a central cavity that extends lengthwise along a longitudinal central axis between open opposite ends of said seamless, circumferentially continuous, tubular outer wall;
    said opposite edges of said inner wall being wrapped toward one another to form the inner wall as being a wrapped inner wall; and
    said seamless, circumferentially continuous, tubular outer wall being everted about said wrapped inner wall to circumferentially envelop at least a portion of said wrapped inner wall such that said wrapped inner wall is at least partially disposed in said central cavity, with said opposite edges of said inner wall extending generally parallel to said longitudinal central axis.

2. The knit sleeve of claim 1, wherein said opposite ends of said seamless, circumferentially continuous, tubular outer wall and said wrapped inner wall are substantially flush with one another upon disposing said wrapped inner wall in said central cavity.

3. The knit sleeve of claim 1, wherein the yarn forming said outer wall has greater impact resistance relative to the yarn forming said inner wall.

4. The knit sleeve of claim 3, wherein the yarn forming said outer wall comprises one or more material of the group consisting of at least one of polyester, nylon, polypropylene, polyethylene, acrylic, cotton, rayon.

5. The knit sleeve of claim 4, wherein the yarn forming said inner wall is a multifilament mineral fiber.

6. The knit sleeve of claim 5, wherein the yarn forming said inner wall comprises one or more material of the group consisting of at least one of silica, fiberglass, ceramic, basalt, slate, slag, aramid and carbon.

7. The knit sleeve of claim 1, wherein the yarn forming said outer wall is coated with an impact resistant material.

8. The knit sleeve of claim 7, wherein the impact resistant material coating the yarn of said outer wall is made of silicone or polytetrafluoroethylene.

9. The knit sleeve of claim 1, wherein the yarn forming said inner wall has greater heat-resistance relative to the yarn forming said outer wall.

10. The knit sleeve of claim 9, wherein the yarn forming said inner wall is a multifilament mineral fiber.

11. The knit sleeve of claim 9, wherein the yarn forming said inner wall comprises one or more material of the group consisting of at least one of silica, fiberglass, ceramic, basalt, slate, slag, aramid and carbon.

12. A method of constructing a tubular textile sleeve for providing a thermal barrier about an elongate member extending therethrough, comprising:
    knitting a single layer inner wall having opposite edges extending lengthwise between opposite ends; and
    knitting a seamless, circumferentially continuous, tubular outer wall having a central cavity extending lengthwise along a central axis between open opposite ends integrally with the inner wall such that the inner wall extends away from the outer wall, wherein the inner wall is wrappable to form the inner wall into a tubular wall and wherein the outer wall is everted about the inner wall to form the sleeve having a dual layer wall, with said opposite edges of said inner wall extending generally parallel to said longitudinal central axis.

13. The method of claim 12, further including wrapping the inner wall to form the inner wall into a tubular wall and everting the seamless, circumferentially continuous, tubular outer wall about the wrapped tubular inner wall to circumferentially surround the tubular inner wall.

14. The method of claim 12, further including integrally knitting one of the opposite edges of the inner wall to the outer wall.

15. The method of claim 12, further including integrally knitting the outer wall to extend lengthwise between the opposite ends of the inner wall and to extend between the opposite edges of the inner wall with the central axis extending in generally parallel relation with the opposite edges.

16. The method of claim 12, further including forming the outer wall with yarn having a greater impact resistance relative to the yarn forming the inner wall.

17. The method of claim 16, further including forming the outer wall comprising one or more material of the group consisting of polyester yarn, nylon yarn, polypropylene yarn, polyethylene yarn, acrylic yarn, cotton yarn, and rayon yarn.

18. The method of claim 12, further coating the yarn of the outer wall with an impact resistant material.

19. The method of claim 18, further including providing the impact resistant material coating the yarn of the outer wall being made of silicone or polytetrafluoroethylene.

20. The method of claim 12, further including forming the inner wall with a heat resistant mineral yarn, such as from fiberglass, silica, basalt, ceramic, slate, slag, or the like, and forming the outer wall from a different yarn having an increased impact resistance relative to the yarn forming the inner wall.

21. The method of claim 12, further including knitting the inner wall with a first type of yarn and knitting the outer wall with a second type of yarn different from the first type of yarn, wherein the first type of yarn has an increased thermal insulating property relative to the second type of yarn and the second type of yarn has an increased toughness relative to the first type of yarn.

* * * * *